(12) United States Patent
Huang et al.

(10) Patent No.: US 12,712,456 B2
(45) Date of Patent: Aug. 18, 2026

(54) TRANS-INDUCTOR VOLTAGE REGULATOR (TLVR) INDUCTOR MODULE AND POWER ELECTRONICS ASSEMBLY INCLUDING THE TLVR INDUCTOR MODULE

(71) Applicant: Infineon Technologies Austria AG, Villach (AT)

(72) Inventors: Wenkang Huang, East Greenwich, RI (US); Surendhar Somasundaram, Santa Clara, CA (US); Darryl Galipeau, Warwick, RI (US)

(73) Assignee: Infineon Technologies Austria AG, Villach (AT)

( * ) Notice: Subject to any disclaimer, the term of this patent is extended or adjusted under 35 U.S.C. 154(b) by 203 days.

(21) Appl. No.: 18/647,815

(22) Filed: Apr. 26, 2024

(65) Prior Publication Data

US 2025/0337324 A1 Oct. 30, 2025

(51) Int. Cl.
*H02M 3/158* (2006.01)
*H01F 27/24* (2006.01)
*H01F 27/30* (2006.01)

(52) U.S. Cl.
CPC .......... *H02M 3/1586* (2021.05); *H01F 27/24* (2013.01); *H01F 27/30* (2013.01)

(58) Field of Classification Search
CPC ....... H02M 3/1586; H01F 27/24; H01F 27/30
See application file for complete search history.

(56) References Cited

U.S. PATENT DOCUMENTS

2022/0189673 A1* 6/2022 Syed Mohammed ........................ H01F 17/0033
2022/0415558 A1* 12/2022 Nan .................... H01F 27/2804
2023/0253146 A1* 8/2023 Miao ..................... H01F 27/292 336/221
2025/0118478 A1* 4/2025 Zhang ..................... H01F 41/26
2025/0157709 A1* 5/2025 Luo ........................... H01F 5/04

OTHER PUBLICATIONS

Krishnamurthy, Shreyankh; West, Davcid, Zhou, Yosef; Trans-Inductor Voltage Regulator (TLVR): Circuit Operation, Power Magnetic Construction, Efficiency and Cost Trade Off; PCIM Europe, May 2022; pp. 375-380.*
"Demystifying dual winding TLVR inductors", Eaton TLVR inductors white paper, www.eaton.com/electronics, 2022, pp. 1-4.

* cited by examiner

*Primary Examiner* — Harry R Behm
(74) *Attorney, Agent, or Firm* — Murphy, Bilak & Homiller, PLLC

(57) ABSTRACT

A trans-inductor voltage regulator (TLVR) inductor module includes: a magnetic core; a first winding embedded in the magnetic core; a second winding embedded in the magnetic core and inductively coupled to the first winding; a third winding embedded in the magnetic core; a fourth winding embedded in the magnetic core and inductively coupled to the third winding; and a first integrated metallic connector that connects the second winding and the fourth winding in a series loop. A power electronics assembly that includes the TLVR inductor module is also described.

21 Claims, 8 Drawing Sheets

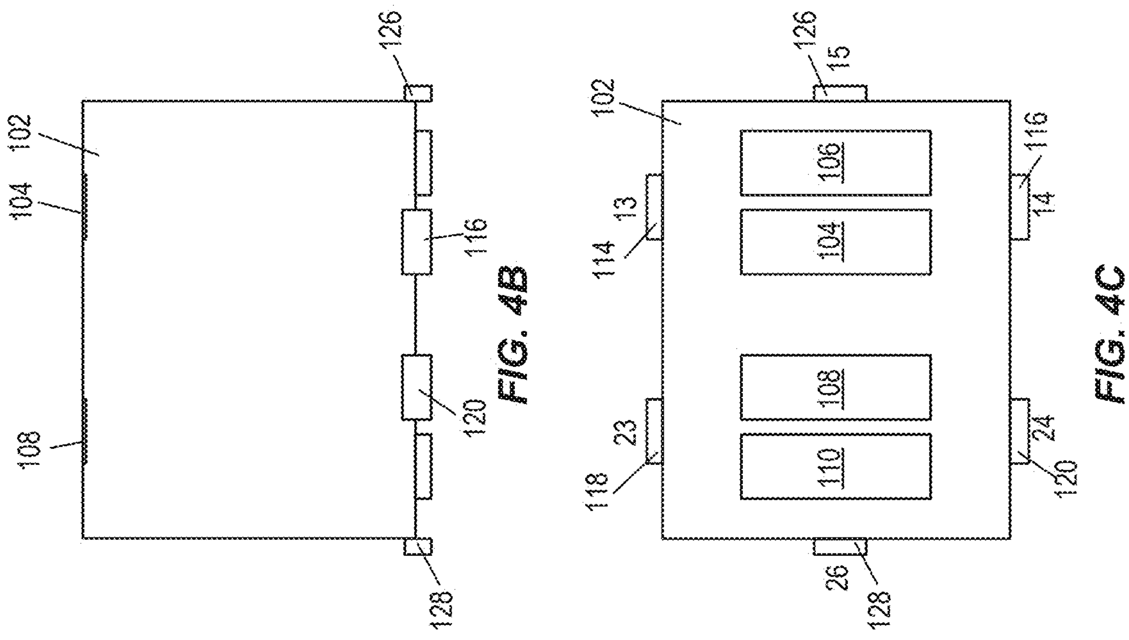
102
104
108
126
116
120
128
FIG. 4B
102
126
15
13
114
23
118
106
104
108
110
116
14
24
120
26
128
FIG. 4C
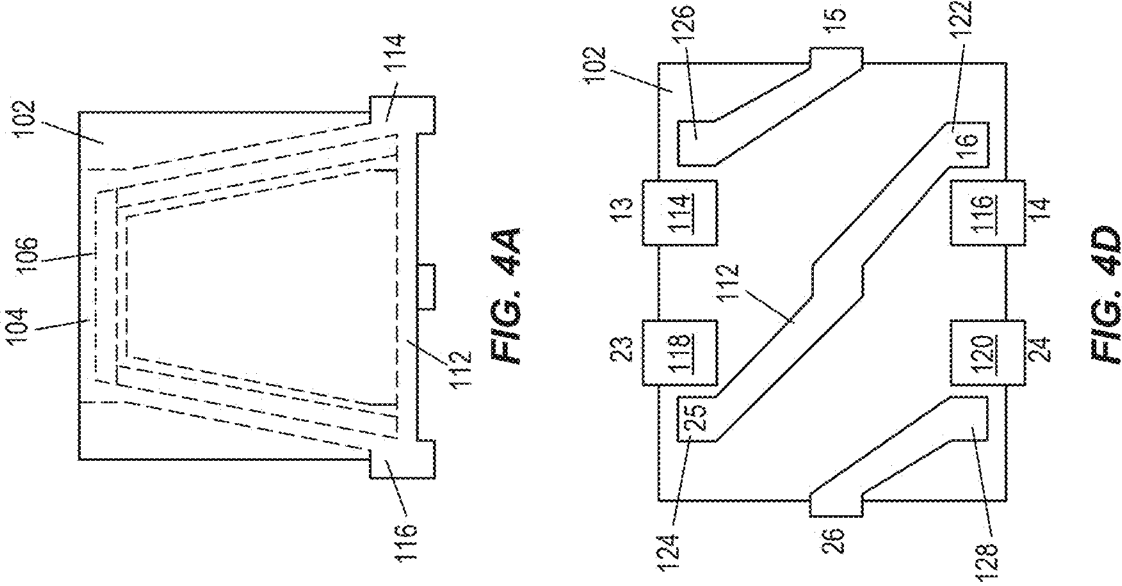
102
106
104
114
112
116
FIG. 4A
102
126
15
122
13
114
116
14
16
23
118
120
24
112
25
124
26
128
FIG. 4D

TRANS-INDUCTOR VOLTAGE REGULATOR (TLVR) INDUCTOR MODULE AND POWER ELECTRONICS ASSEMBLY INCLUDING THE TLVR INDUCTOR MODULE

BACKGROUND

Many applications such as datacenters, storage systems, graphics cards, personal computing, etc. require a multi-phase architecture to power system components such as processors, memory, high current ASICs (application-specific integrated circuits), FPGAs (field-programmable gate arrays), etc. For these applications and others where transient response and precise control of the output voltage during load steps is critical, the trans-inductor voltage regulator (TLVR), which replaces traditional inductors with 1:1 ratio transformers, improves transient response and voltage regulation. Conventional TLVRs typically use either a separate inductor module for each phase of the system or a dual-inductor module that supports two phases. In either case, the inductor modules include a separate printed circuit board (PCB) to facilitate the secondary-side winding connections. The inductor module PCB introduces switching noise to other circuits through the PCB traces for the secondary winding connection.

Thus, there is a need for an improved TLVR inductor module design which introduces less switching noise.

SUMMARY

According to an embodiment of a trans-inductor voltage regulator (TLVR) inductor module, the TLVR inductor module comprises: a magnetic core; a first winding embedded in the magnetic core; a second winding embedded in the magnetic core and inductively coupled to the first winding; a third winding embedded in the magnetic core; a fourth winding embedded in the magnetic core and inductively coupled to the third winding; and a first integrated metallic connector that connects the second winding and the fourth winding in a series loop.

According to an embodiment of a power electronics assembly, the power electronics assembly comprises: a power stage module comprising a circuit board and a plurality of power semiconductor dies attached to or embedded in the circuit board and electrically interconnected to form part of a power converter circuit; and a trans-inductor voltage regulator (TLVR) inductor module directly mounted to the circuit board of the power stage module without any intervening circuit board, wherein the TLVR inductor module comprises: a magnetic core; a first winding embedded in the magnetic core; a second winding embedded in the magnetic core and inductively coupled to the first winding; a third winding embedded in the magnetic core; a fourth winding embedded in the magnetic core and inductively coupled to the third winding; and a first integrated metallic connector that connects the second winding and the fourth winding in a series loop, wherein the first winding and the third winding form part of the power converter circuit.

Those skilled in the art will recognize additional features and advantages upon reading the following detailed description, and upon viewing the accompanying drawings.

BRIEF DESCRIPTION OF THE FIGURES

The elements of the drawings are not necessarily to scale relative to each other. Like reference numerals designate corresponding similar parts. The features of the various illustrated embodiments can be combined unless they exclude each other. Embodiments are depicted in the drawings and are detailed in the description which follows.

FIG. 3A shows a cross-sectional view of the TLVR inductor module from the front side to the rear (mounting) side of the module, FIG. 3B shows a side view of the TLVR inductor module, FIG. 3C shows a plan view of the front side of the TLVR inductor module opposite the rear side, and FIG. 3D shows the same view as FIG. 3C but looking through the TLVR inductor module to the rear side of the TLVR inductor module.

FIGS. 4A through 4D illustrate different views of the TLVR inductor module, according to another embodiment, where FIG. 4A shows a cross-sectional view of the TLVR inductor module from the front side to the rear (mounting) side of the module, FIG. 4B shows a side view of the TLVR inductor module, FIG. 4C shows a plan view of the front side of the TLVR inductor module opposite the rear side, and FIG. 4D shows the same view as FIG. 4C but looking through the TLVR inductor module to the rear side of the TLVR inductor module.

DETAILED DESCRIPTION

The embodiments described herein provide a trans-inductor voltage regulator (TLVR) inductor module with internal secondary-side winding connections. By eliminating the need for a PCB to complete the secondary-side winding connections, the TLVR inductor module minimizes switching noise coupling to other circuits through the secondary winding connection. Also, the TLVR inductor module can be directly mounted to a power stage module without requiring an intermediate PCB.

Described next, with reference to the figures, are exemplary embodiments of the TLVR inductor module and a power electronics assembly that includes the TLVR inductor module.

Figures 1A, 1B:
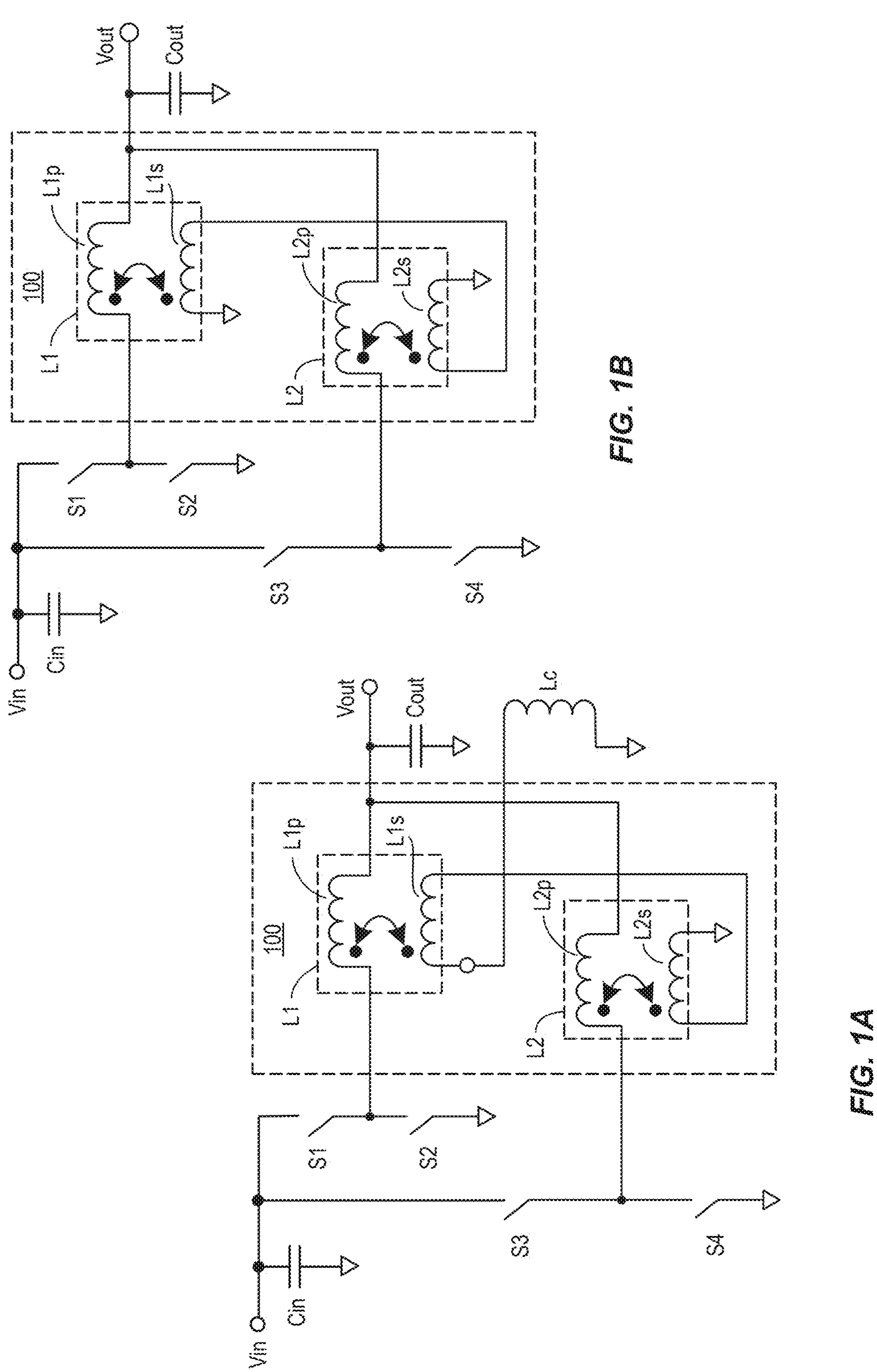
FIG. 1A illustrates a schematic diagram of a power electronics circuit that includes a trans-inductor voltage regulator (TLVR) inductor module.
FIG. 1B illustrates a schematic diagram of the power electronics circuit, according to another embodiment.

FIG. 1A illustrates a schematic diagram of a power electronics circuit that includes a TLVR inductor module 100. The power electronics circuit also includes switch devices S1, S2, S3, S4. The switch devices S1, S2, S3, S4 are electrically interconnected to form part of the power converter circuit. For example, the power converter circuit is shown as a two-phase DC-DC converter with two pairs of switch devices S1/S2, S3/S4, two TLVR inductors L1, L2 integrated in the TLVR inductor module 100, and decoupling capacitors Cin, Cout. More generally, the power converter circuit may have a single phase, two phases, or more than two phases (e.g., 3 phases, 4 phases, etc.). The TLVR inductor module embodiments described herein are explained in the context of 2-phase and 3-phase power converter systems but may be readily extended to four (4) or more phases.

The TLVR inductors L1, L2 each have a primary winding L1*p*, L2*p* and a secondary winding L1*s*, L2*s*. In FIG. 1A, the primary winding L1*p* of the first TLVR inductor L1 is connected between the midpoint of switch devices S1, S2 and the converter output Vout. The primary winding L2*p* of the second TLVR inductor L2 is connected between the midpoint of switch devices S3, S4 and the converter output Vout. The secondary winding L1*s*, L2*s* is tightly coupled to the primary winding L1*p*, L2*p* of the same TLVR inductor L1, L2, e.g., with a coupling coefficient of 70% or higher. The secondary windings L1*s*, L2*s* of the TLVR inductors L1, L2 are connected in series to form a loop through ground connections.

In FIG. 1A, an inductor Lc outside the TLVR inductor module 100 forms part of the loop that includes the secondary windings L1*s*, L2*s* of the TLVR inductors L1, L2. FIG. 1B shows the power electronics circuit without the inductor Lc in the loop that includes the secondary windings L1*s*, L2*s* of the TLVR inductors L1, L2. Also in FIG. 1B, the second end of the second winding and the second end of the fourth winding are both grounded.

Figures 2, 3A, 3B, 3C, 3D:
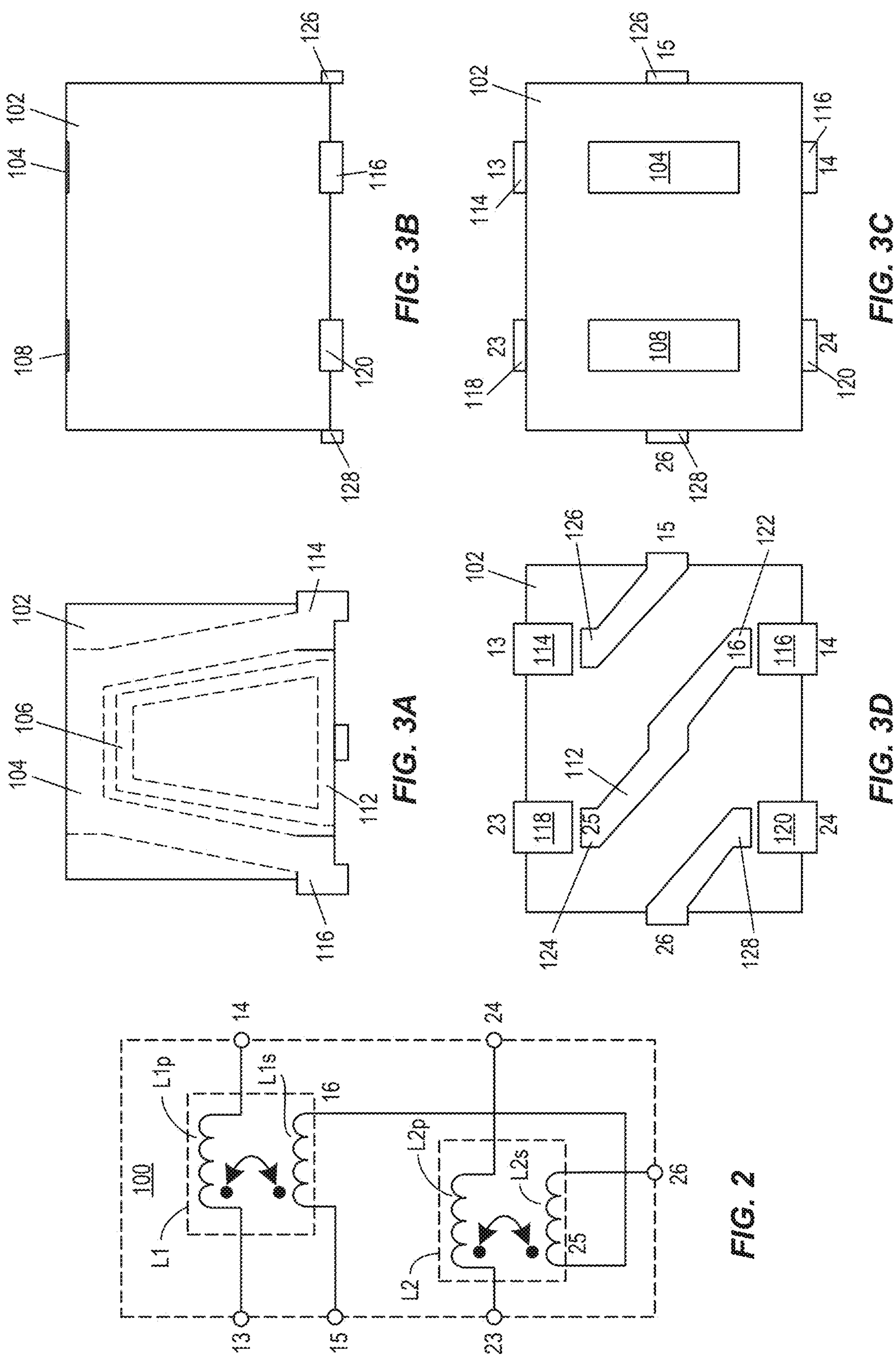
FIG. 2 illustrates a schematic diagram of just the TLVR inductor module with the corresponding secondary-side winding connections, according to an embodiment.
FIGS. 3A through 3D illustrate different views of the TLVR inductor module, according to another embodiment, where

FIG. 2 illustrates a schematic diagram of just the TLVR inductor module 100 with the corresponding secondary-side winding connections. Inductor Lc is not shown in FIG. 2 for ease of illustration but may be provided separate from the TLVR inductor module 100 and form part of the loop that includes the secondary windings L1*s*, L2*s* of the TLVR inductors L1, L2.

In FIG. 2, a first end 13 and a second end 14 of the first primary winding L1*p* and a first end 23 and a second end 24 of the second primary winding L2*p* each form a respective terminal of the TLVR inductor module 100. A second end 15 of the first secondary winding L1*s* and a second end 26 of the second secondary winding L2*s* also form terminals of the TLVR inductor module 100.

The terminals provide an electrical connection interface to the TLVR inductor module 100 for external components such as a power stage module. A first end 16 of the secondary winding L1*s* of the first TLVR inductor L1 and a first end 25 of the secondary winding L2*s* of the second TLVR inductor L2 are connected in series to form a loop through ground connections. Again, a 2-phase implementation is shown in FIG. 2 merely as an example. The TLVR inductor module 100 may implement a single phase or more than one phase (e.g., 2, 3, 4 or more phases) of a power converter system.

FIGS. 3A through 3D illustrate different views of the TLVR inductor module 100, according to an embodiment. FIG. 3A shows a cross-sectional view of the TLVR inductor module 100 from the front side to the rear (mounting) side of the module 100. FIG. 3B shows a side view of the TLVR inductor module 100. FIG. 3C shows a plan view of the front side of the TLVR inductor module 100 opposite the rear side. FIG. 3D shows the same view as FIG. 3C but looking through the TLVR inductor module 100 to the rear side of the TLVR inductor module 100.

The TLVR inductor module 100 includes a magnetic core 102 comprising a ferromagnetic metal such as iron or a ferrimagnetic compound such as ferrite, a first winding 104 embedded in the magnetic core 102, and a second winding 106 embedded in the magnetic core 102 and inductively coupled to the first winding 104. The first and second windings 104, 106 correspond to the primary winding L1*p* and the secondary winding L1*s*, respectively, of the first TLVR inductor L1 shown in the schematic illustrations of FIGS. 1A-1B and 2.

The TLVR inductor module 100 also includes a third winding 108 embedded in the magnetic core 102 and a fourth winding 110 embedded in the magnetic core 102 and inductively coupled to the third winding 108. The third and fourth windings are out of view in FIGS. 3A through 3D and correspond to the primary winding L2*p* and the secondary winding L2*s*, respectively, of the second TLVR inductor L2 shown in the schematic illustrations of FIGS. 1A-1B and 2.

The first and second windings 104, 106 and the third and fourth windings 108, 110 share the same magnetic core 102 with minimum coupling between the two primary windings 104, 108 and minimum coupling between the two secondary windings 106, 110, but with maximum coupling between the primary winding 104/108 and the secondary winding 106/110 of each phase. That is, maximum coupling is provided between the first and second windings 104, 106 which support the first phase and maximum coupling is provided between the third and fourth windings 108, 110 which support the second phase. In one embodiment, the maximum coupling is in a range of 70% to 100%.

The TLVR inductor module 100 further includes a first integrated metallic connector 112 that connects the second winding 106 and the fourth winding 110 in a series loop. The series loop completed by the first integrated metallic connector 112 corresponds to the loop that includes the secondary windings L1*s*, L2*s* of the TLVR inductors L1, L2 shown in the schematic illustrations of FIGS. 1A-1B and 2.

A first end 114 and a second end 116 of the first winding 104 and a first end 118 and a second end 120 of the third winding 108 are exposed at the rear (mounting) side of the TLVR inductor module 100. The first end 114 and the second end 116 of the first winding 104 correspond to the first end 13 and the second end 14, respectively, of the primary winding L1*p* of the first TLVR inductor L1 shown in the schematic illustrations of FIGS. 1A-1B and 2. The first end 118 and the second end 120 of the third winding 108 correspond to the first end 23 and the second end 24, respectively, of the primary winding L2*p* of the second TLVR inductor L2 shown in the schematic illustrations of FIGS. 1A-1B and 2.

The first integrated metallic connector 112 interconnects a first end 122 of the second winding 106 and a first end 124 of the fourth winding 110 at the rear (mounting) side of the TLVR inductor module 100. The first end 122 of the second winding 106 corresponds to the first end 16 of the secondary winding L1*s* of the first TLVR inductor L1 shown in the schematic illustrations of FIGS. 1A-1B and 2. The first end 124 of the fourth winding 110 corresponds to the first end 25 of the secondary winding L2*s* of the second TLVR inductor L2 shown in the schematic illustrations of FIGS. 1A-1B and 2.

The first integrated metallic connector 112 may be exposed at the rear (mounting) side of the TLVR inductor module 100, e.g., as shown in FIG. 3B. However, the first integrated metallic connector 112 instead may be completely embedded in the magnetic core 102 and therefore not exposed at the rear (mounting) side of the TLVR inductor module 100.

Similarly, the first end 122 of the second winding 106 and the first end 124 of the fourth winding 110 may be exposed at the rear (mounting) side of the TLVR inductor module 100, to provide an option to connect the second and fourth windings 106, 110 through a PCB trace under the TLVR inductor module 100. However, the first end 122 of the second winding 106 and the first end 124 of the fourth winding 110 instead may be completely embedded in the magnetic core 102 and therefore not exposed at the rear (mounting) side of the TLVR inductor module 100.

A second end 126 of the second winding 106 and a second end 128 of the fourth winding 110 may be exposed at the rear (mounting) side of the TLVR inductor module 100. The second end 126 of the second winding 106 is extended to the second end 15 of the secondary winding L1*s* of the first TLVR inductor L1 shown in the schematic illustrations of FIGS. 1A-1B and 2. The second end 128 of the fourth winding 110 is extended to the second end 26 of the secondary winding L2*s* of the second TLVR inductor L2 shown in the schematic illustrations of FIGS. 1A-1B and 2.

In FIGS. 3A through 3D, the first winding 104 covers the second winding 106 and the third winding 108 covers the fourth winding 110. As shown in FIG. 3D, the first winding 104 and the third winding 108 may be exposed at the front side of the TLVR inductor module 100 opposite the rear (mounting) side.

FIGS. 4A through 4D illustrate different views of the TLVR inductor module 100, according to another embodiment. FIG. 4A shows a cross-sectional view of the TLVR inductor module 100 between the front side and the rear (mounting) side of the module 100. FIG. 4B shows a side view of the TLVR inductor module 100. FIG. 4C shows a plan view of the front side of the TLVR inductor module 100 opposite the rear side. FIG. 4D shows the same view as FIG. 4C but looking through the TLVR inductor module 100 to the rear side of the TLVR inductor module 100.

In FIGS. 4A through 4D, the second winding 106 is arranged side-by-side the first winding 104 and the fourth winding 110 is arranged side-by-side the third winding 108. The side-by-side configuration of the first and second windings 104, 106 is indicated by dashed lines in FIG. 4A. As shown in FIG. 4D, the first winding 104 and the third winding 108 may be exposed at the front side of the TLVR inductor module 100 opposite the rear (mounting) side. The second winding 106 and the fourth winding 110 also may be exposed at the front side of the TLVR inductor module 100, according to the side-by-side winding embodiment.

Figure 5B:
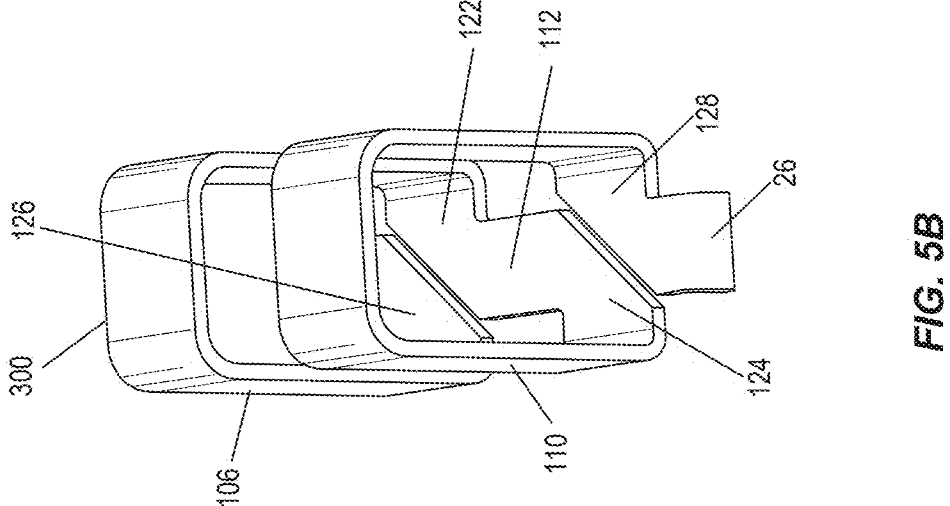
FIGS. 5A and 5B illustrate different side perspective views of second and fourth windings interconnected by an integrated metallic connector integrated in the TLVR inductor module, according to an embodiment.
Figure 5A:
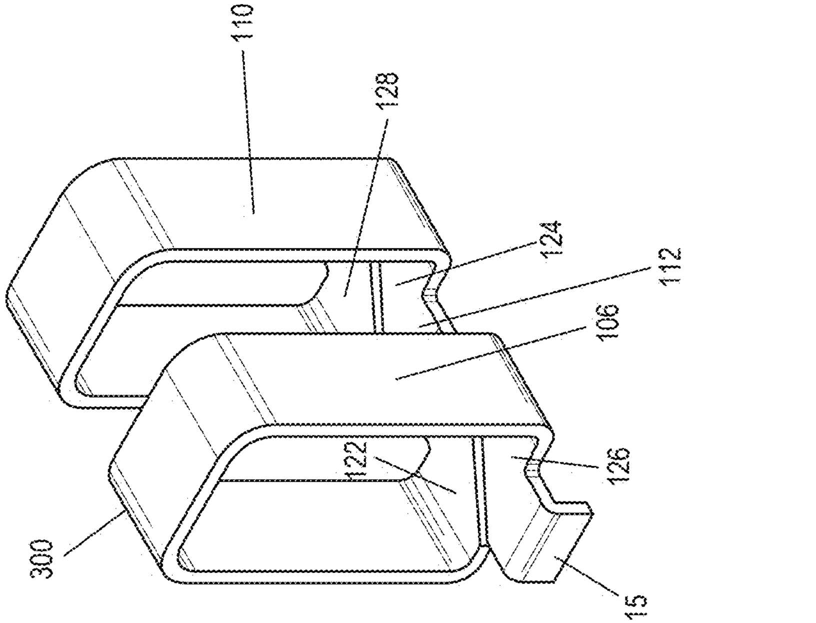

FIGS. 5A and 5B illustrate different side perspective views of the second and fourth windings 106, 110 interconnected by the first integrated metallic connector 112 integrated in the TLVR inductor module 100, according to an embodiment. As explained in connection with FIGS. 3A through 3D, the first integrated metallic connector 112 interconnects the first end 122 of the second winding 106 and the first end 124 of the fourth winding 110 at the rear (mounting) side of the TLVR inductor module 100. In FIGS. 5A and 5B, a single continuous metallic body 300 forms the second winding 106, the fourth winding 110, and the first integrated metallic connector 112. The single continuous metallic body 300 may be stamped from a metallic (e.g., Cu) sheet and bent to form the second winding 106, the fourth winding 110, and the first integrated metallic connector 112 as a single continuous body.

Figure 6:
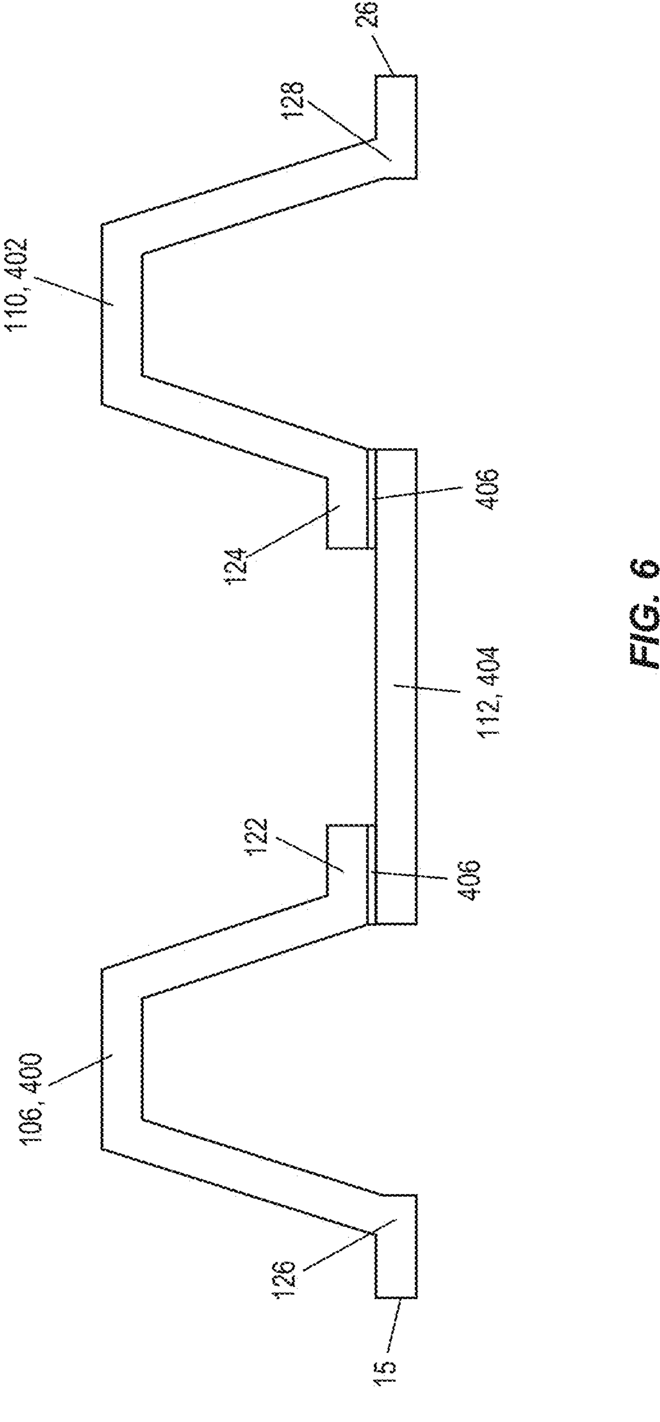
FIG. 6 illustrates a side view of the second and fourth windings interconnected by the integrated metallic connector, according to another embodiment.

FIG. 6 illustrates a side view of the second and fourth windings 106, 110 interconnected by the first integrated metallic connector 112 integrated in the TLVR inductor module 100, according to another embodiment. In FIG. 6, the first integrated metallic connector 112 is separate from both the second winding 106 and the fourth winding 110. That is, each of the first integrated metallic connector 112, the second winding 106, and the fourth winding 110 are individual metallic bodies 400, 402, 404. According to this embodiment, the first integrated metallic connector 112 is attached to the first end 122 of the second winding 106 and to the first end 124 of the fourth winding 110 by a joining material 406 such as solder, glue, tape, etc. or by a joint 406 such as a brazed or welded joint.

Figures 7A, 7B:
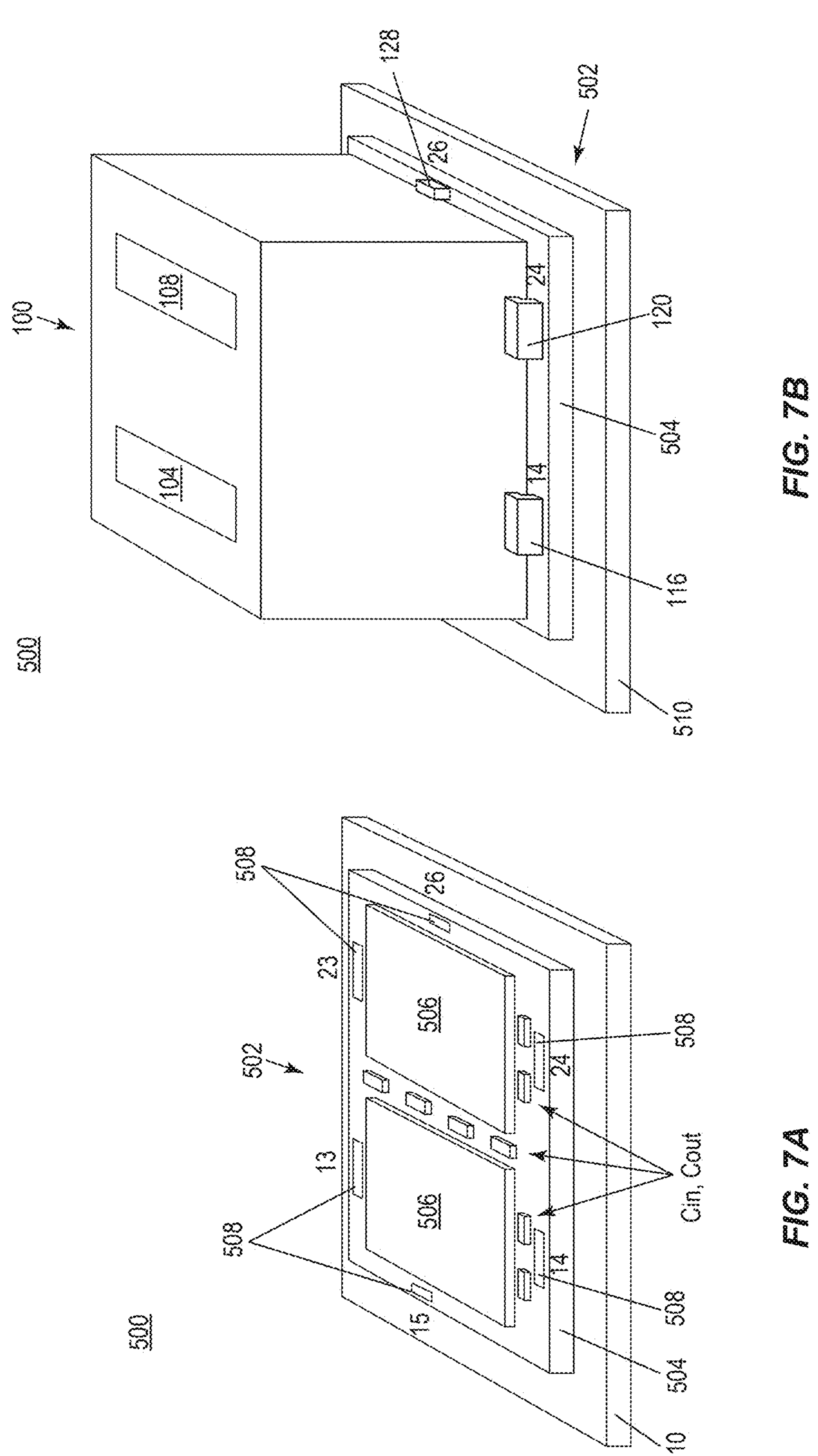
FIGS. 7A and 7B illustrate side perspective views of a power electronics assembly that includes the TLVR inductor module.

FIGS. 7A and 7B illustrate side perspective views of a power electronics assembly 500 that includes the TLVR inductor module 100. The TLVR inductor module 100 supports two (2) phases in this example, but can include one or more additional sets of windings to support additional phases.

The power electronics assembly 500 also includes a power stage module 502. The power stage module 502 includes a circuit board 504 such as a PCB and a plurality of power semiconductor dies 506 attached to or embedded in the circuit board 504. The power semiconductor dies 506 may include power MOSFETs (metal-oxide-semiconductor field-effect transistors), HEMTs (high-electron mobility transistors), IGBTs (insulated-gate bipolar transistors), JFETs (junction filed-effect transistors), power diodes, etc. For example, the devices included in the power semiconductor dies 506 may correspond to the switch devices S1 through S4 shown in the schematic illustrations of FIGS. 1A-1B and 2.

The power semiconductor dies 506 are electrically interconnected to form part of a power converter circuit such as a multi-phase buck converter, multi-phase boost converter, multi-phase buck-boost converter, etc. The first winding 104 and the third winding 108 of the TLVR inductor module 100 form part of the power converter circuit, e.g., output inductors of a multi-phase buck, boost, or buck-boost converter.

The TLVR inductor module 100 is directly mounted to the circuit board 504 of the power stage module 502 without any intervening circuit board. Accordingly, the TLVR inductor module 100 minimizes switching noise coupling to other circuit components of the power electronics assembly 500 through the secondary winding connections which are implemented by the first integrated metallic connector 112 integrated in the TLVR inductor module 100 instead of a PCB trace outside the TLVR inductor module 100.

FIG. 7A shows the power stage module 502 before direct mounting of the TLVR inductor module 100, and FIG. 7B shows the power stage module 502 after direct mounting of the TLVR inductor module 100. The TLVR inductor module 100 may be soldered, brazed, glued, etc. to exposed contact pads 508 of the circuit board 504 of the power stage module 502.

The TLVR inductor module 100 may be implemented with the side-by-side winding configuration illustrated in FIGS. 4A through 4D, or with the stacked (covered) winding configuration illustrated in FIGS. 3A through 3D. In either case, the first end 114 and the second end 116 of the first winding 104 and the first end 118 and the second end 120 of the third winding 108 are exposed at the rear (mounting) side of the TLVR inductor module 100 and attached to the corresponding pads 508 of the circuit board 504 of the power stage module 502.

The second end 126 of the second winding 106 and the second end 128 of the fourth winding 110 of the TLVR inductor module 100 are also exposed at the rear (mounting) side of the TLVR inductor module 100 and attached to the corresponding pads 508 of the circuit board 504 of the power stage module 502. For example, the second end 126 of the second winding 106 and the second end 128 of the fourth winding 110 may be attached to ground pads 508 of the power stage module circuit board 504, so that the second end 126 of the second winding 106 and the second end 128 of the fourth winding 110 are both grounded, e.g., as schematically shown in FIG. 1B.

The second end 126 of the second winding 106 and the second end 128 of the fourth winding 110 of the TLVR inductor module 100 may be exposed at the rear (mounting) side of the TLVR inductor module 100, to provide an option to connect the second and fourth windings 106, 110 through corresponding pads 508 of the power stage module circuit board 504. However, the second end 126 of the second winding 106 and the second end 128 of the fourth winding 110 instead may be completely embedded in the magnetic core 102 of the TLVR inductor module 100 and therefore not exposed at the rear (mounting) side of the TLVR inductor module 100. The decoupling capacitors Cin, Cout shown in FIGS. 1A through 2 may be mounted to the same side of the power stage module circuit board 504 as the TLVR inductor module 100, as indicated in FIGS. 7A and 7B.

The power stage module 502 may be mounted to a system board 510 such as a motherboard at the opposite side of the power stage module 502 as the TLVR inductor module 100. Although not shown in FIGS. 7A and 7B, the power electronics assembly 500 may also include the inductor Lc shown in FIG. 1A attached to the circuit board 504 of the power stage module 502 and included in the series loop between the second end 126 of the second winding 106 and the second end 128 of the fourth winding 110 of the TLVR inductor module 100.

The first winding 104 and the third winding 108 of the TLVR inductor module 100 may be exposed at the side of the TLVR inductor module 100 that faces away from the power stage module 502, e.g., as shown in FIG. 7B for the stacked (covered) winding configuration. For the side-by-side winding configuration illustrated in FIGS. 4A through 4D, the second winding 106 and the fourth winding 110 also may be exposed at the side of the TLVR inductor module 100 that faces away from the power stage module 502.

Figure 8:
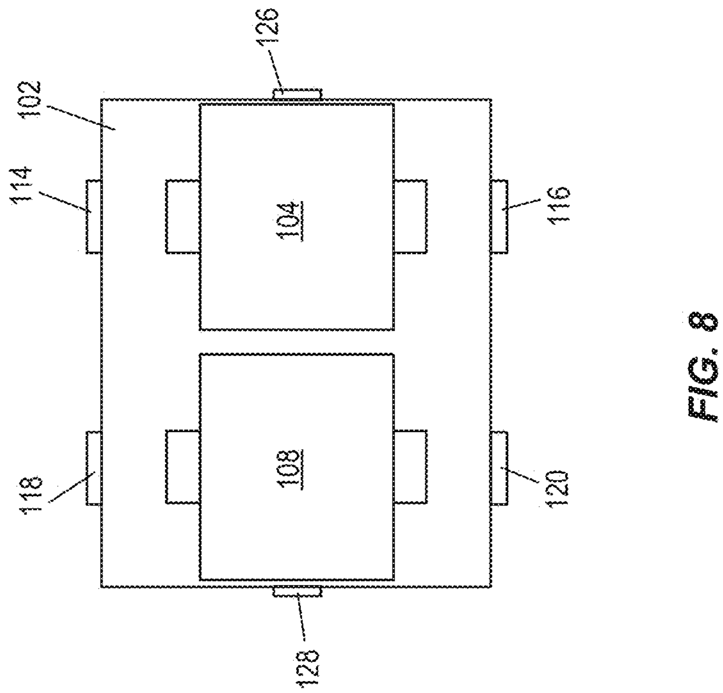
FIG. 8 shows a top plan view of another embodiment of a stacked (covered) winding configuration for the TLVR inductor module.

FIG. 8 shows a top plan view of another embodiment of the stacked (covered) winding configuration and according to which the area of the exposed part of the first winding 104 and the area of the exposed part of the third winding 108 are increased to improve the thermal interface at the side of the TLVR inductor module 100 that faces away from the power stage module 502. Cooling through the inductor windings 104, 108 helps compensate for increased power module density, which is particularly beneficial if direct cooling of the underlying power stage module 502 is not feasible.

Figure 9:
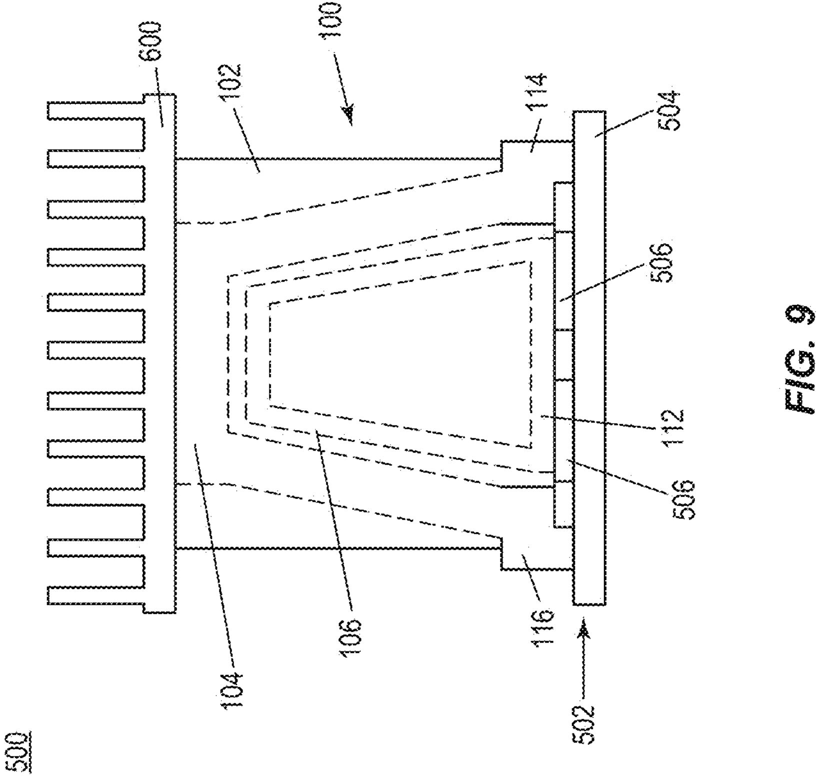
FIG. 9 illustrates a simplified cross-sectional view of the power electronics assembly, according to another embodiment.

FIG. 9 illustrates a simplified cross-sectional view of the power electronics assembly 500, according to another embodiment. In FIG. 9, a heat exchanger 600 is mounted to the side of the TLVR inductor module 100 that faces away from the power stage module 502. The heat exchanger 600 is thermally coupled to the exposed part of the first winding 104 and the third winding 108 at the side of the TLVR inductor module 100 that faces away from the power stage module 502. For the side-by-side winding configuration illustrated in FIGS. 4A through 4D, the second winding 106 and the fourth winding 110 also may be exposed at the side of the TLVR inductor module 100 that faces away from the power stage module 502 and the heat exchanger 600 may be thermally coupled to the exposed part of the second winding 106 and the fourth winding 110, as well.

As shown in FIGS. 7A, 7B and 9, the power semiconductor dies 506 of the power stage module 502 may be attached to a side of the circuit board 502 to which the TLVR inductor module 100 is directly mounted and the power semiconductor dies 506 may be interposed between the TLVR inductor module 100 and the circuit board 502, to further improve the thermal efficiency of the power electronics assembly 500. This is just one die placement example, however. Other die placement configurations are contemplated, and depend on the design of the power stage module 502.

Heretofore, the TLVR inductor module 100 has been described mostly in the context of a 2-phase power converter system. As previously explained, the TLVR inductor module embodiments described herein may be readily extended to accommodate more phases (3 phases, 4 phases, or more).

Figure 11:
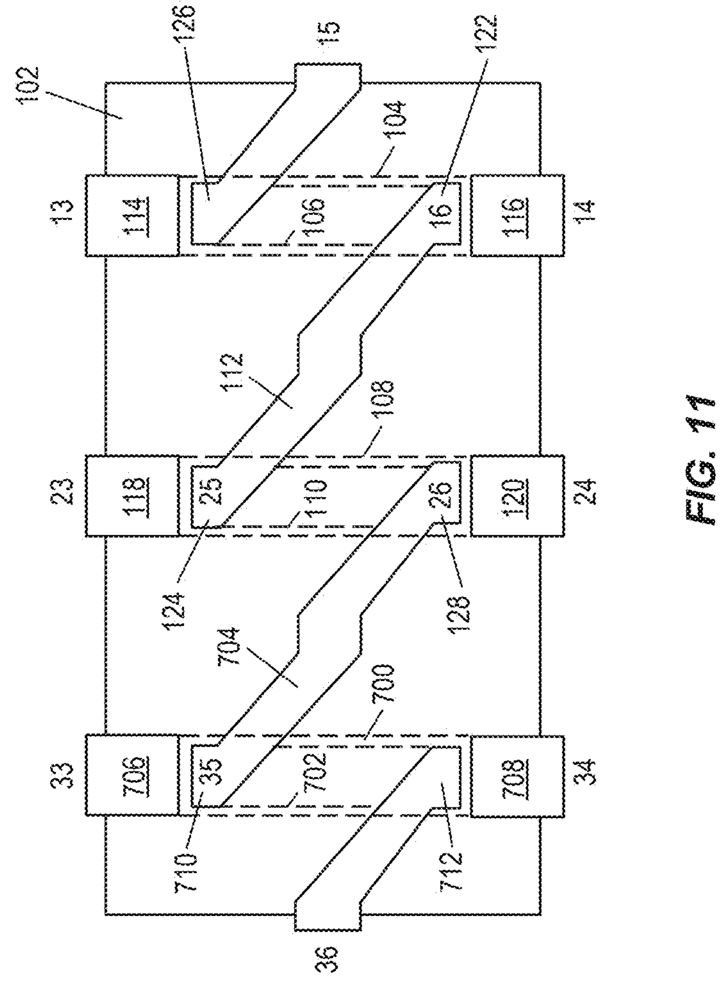
FIG. 11 illustrates a corresponding bottom plan view of the TLVR inductor module.
Figure 10:
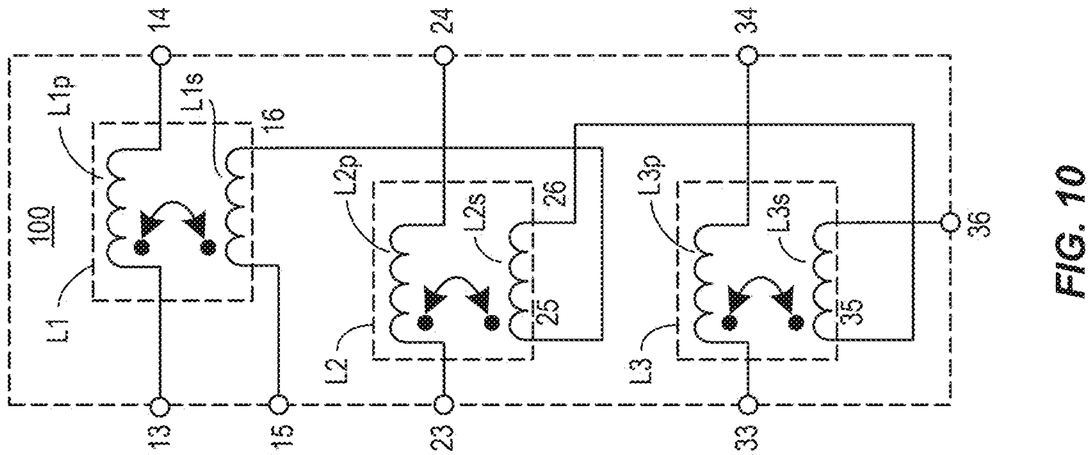
FIG. 10 illustrates a schematic diagram of the TLVR inductor module configured for a 3-phase power converter system.

FIG. 10 illustrates a schematic diagram of the TLVR inductor module 100 configured for a 3-phase power converter system. FIG. 11 illustrates a corresponding view looking through the TLVR inductor module to the rear (mounting) side of the TLVR inductor module 100.

In FIGS. 10 and 11, the TLVR inductor module 100 further includes a fifth winding 700 embedded in the magnetic core 102 and a sixth winding 702 embedded in the magnetic core 102 and inductively coupled to the fifth winding 700. The fifth and sixth windings 700, 702 form the third TLVR inductor L3 schematically illustrated in FIG. 10, where the fifth winding 700 corresponds to the primary winding L3*p* of the third TLVR inductor L3 and the sixth winding 702 corresponds to the secondary winding L3*s* of the third TLVR inductor L3. A second integrated metallic connector 704 integrated in the TLVR inductor module 100 connects the sixth winding 702 in the series loop that also includes the second winding 106 and the fourth windings 110. The windings 104, 106, 108, 110, 700, 702 are out of view in FIG. 11 except for the respective ends and therefore illustrated with the aid of dashed lines.

In one embodiment, a single continuous metallic body forms the second winding 106, the fourth winding 110, the sixth winding 702, the first integrated metallic connector 112, and the second integrated metallic connector 704. For example, the single continuous metallic body may be implemented as shown in FIGS. 5A and 5B but also includes the sixth winding 702 and the second integrated metallic connector 704. In another embodiment, the second integrated metallic connector 704 is separate from the second, fourth and sixth windings 106, 110, 702 and separate from the first integrated metallic connector 112. For example, the second, fourth and sixth windings 106, 110, 702 and the first and second integrated metallic connectors 112, 704 may be implemented as shown in FIG. 6 but with a separate metallic body for the sixth winding 702 and another separate metallic body for the second integrated metallic connector 704.

In either case, the first end 706 and the second end 708 of the fifth winding 700 are exposed at the rear (mounting) side of the TLVR inductor module 100. The first end 706 and the second end 708 of the fifth winding 700 correspond to the first end 33 and the second end 34, respectively, of the primary winding L3*p* of the third TLVR inductor L3 shown in the schematic illustration of FIG. 10.

The second integrated metallic connector 704 interconnects the second end 128 of the fourth winding 110 and the first end 710 of the sixth winding 702 at the rear (mounting) side of the TLVR inductor module 100. The second end 712 of the sixth winding 702 is exposed at the rear (mounting) side of the TLVR inductor module 100. The first end 710 and the second end 712 of the sixth winding 702 correspond to the first end 35 and the second end 36, respectively, of the secondary winding L3*s* of the third TLVR inductor L3 shown in the schematic illustration of FIG. 10.

The first end 710 of the sixth winding 702 and the second integrated metallic connector 704 may be exposed at the rear (mounting) side of the TLVR inductor module 100, e.g., as shown in FIG. 11. The first end 710 of the sixth winding 702 and the second integrated metallic connector 704 instead may be completely embedded in the magnetic core 102 of the TLVR inductor module 100.

Although the present disclosure is not so limited, the following numbered examples demonstrate one or more aspects of the disclosure.

Example 1. A trans-inductor voltage regulator (TLVR) inductor module, comprising: a magnetic core; a first winding embedded in the magnetic core; a second winding embedded in the magnetic core and inductively coupled to the first winding; a third winding embedded in the magnetic core; a fourth winding embedded in the magnetic core and inductively coupled to the third winding; and a first integrated metallic connector that connects the second winding and the fourth winding in a series loop.

Example 2. The TLVR inductor module of example 1, wherein a first end and a second end of the first winding and a first end and a second end of the third winding are exposed at a first side of the TLVR inductor module, and wherein the first integrated metallic connector interconnects a first end of the second winding and a first end of the fourth winding at the first side of the TLVR inductor module.

Example 3. The TLVR inductor module of example 2, wherein a second end of the second winding and a second end of the fourth winding are exposed at the first side of the TLVR inductor module.

Example 4. The TLVR inductor module of example 2 or 3, wherein the first winding covers the second winding, wherein the third winding covers the fourth winding, and wherein the first winding and the third winding are exposed at a second side of the TLVR inductor module opposite the first side.

Example 5. The TLVR inductor module of example 2 or 3, wherein the second winding is arranged side-by-side the first winding, wherein the fourth winding is arranged side-by-side the third winding, and wherein the first winding and the third winding are exposed at a second side of the TLVR inductor module opposite the first side.

Example 6. The TLVR inductor module of example 5, wherein the second winding and the fourth winding are exposed at the second side of the TLVR inductor module.

Example 7. The TLVR inductor module of any of examples 1 through 6, wherein a single continuous metallic body forms the second winding, the fourth winding, and the first integrated metallic connector.

Example 8. The TLVR inductor module of any of examples 1 through 6, wherein the first integrated metallic connector is separate from the second winding and the fourth winding, and wherein the first integrated metallic connector is attached to a first end of the second winding and a first end of the fourth winding.

Example 9. The TLVR inductor module of any of examples 1 through 8, further comprising: a fifth winding embedded in the magnetic core; a sixth winding embedded in the magnetic core and inductively coupled to the fifth winding; and a second integrated metallic connector that connects the sixth winding in the series loop.

Example 10. The TLVR inductor module of example 9, wherein a first end and a second end of the first winding, a first end and a second end of the third winding, and a first end and a second end of the fifth winding are exposed at a first side of the TLVR inductor module, wherein the first integrated metallic connector interconnects a first end of the second winding and a first end of the fourth winding at the first side of the TLVR inductor module, and wherein the second integrated metallic connector interconnects a second end of the fourth winding and a first end of the sixth winding at the first side of the TLVR inductor module.

Example 11. The TLVR inductor module of example 10, wherein a second end of the second winding and a second end of the sixth winding are exposed at the first side of the TLVR inductor module.

Example 12. A power electronics assembly, comprising: a power stage module comprising a circuit board and a plurality of power semiconductor dies attached to or embedded in the circuit board and electrically interconnected to form part of a power converter circuit; and a trans-inductor voltage regulator (TLVR) inductor module directly mounted to the circuit board of the power stage module without any intervening circuit board, wherein the TLVR inductor module comprises: a magnetic core; a first winding embedded in the magnetic core; a second winding embedded in the magnetic core and inductively coupled to the first winding; a third winding embedded in the magnetic core; a fourth winding embedded in the magnetic core and inductively coupled to the third winding; and a first integrated metallic connector that connects the second winding and the fourth winding in a series loop, wherein the first winding and the third winding form part of the power converter circuit.

Example 13. The power electronics assembly of example 12, further comprising: an inductor outside the TLVR inductor module and part of the series loop that includes the second winding and the fourth winding of the TLVR inductor module.

Example 14. The power electronics assembly of example 12 or 13, wherein a first end and a second end of the first winding and a first end and a second end of the third winding are exposed at a first side of the TLVR inductor module and attached to the circuit board of the power stage module, and wherein the first integrated metallic connector interconnects a first end of the second winding and a first end of the fourth winding at the first side of the TLVR inductor module.

Example 15. The power electronics assembly of example 14, wherein a second end of the second winding and a second end of the fourth winding are exposed at the first side of the TLVR inductor module and attached to the circuit board of the power stage module.

Example 16. The power electronics assembly of example 15, further comprising: an inductor attached to the circuit board of the power stage module and included in the series loop between the second end of the second winding and the second end of the fourth winding.

Example 17. The power electronics assembly of example 15 or 16, wherein the second end of the second winding and the second end of the fourth winding are grounded.

Example 18. The power electronics assembly of any of examples 12 through 17, wherein the first winding and the third winding are exposed at a side of the TLVR inductor module that faces away from the power stage module.

Example 19. The power electronics assembly of example 18, further comprising: a heat exchanger mounted to the side of the TLVR inductor module that faces away from the power stage module, wherein the heat exchanger is thermally coupled to the exposed part of the first winding and the third winding at the side of the TLVR inductor module that faces away from the power stage module.

Example 20. The power electronics assembly of any of examples 12 through 19, wherein the power semiconductor dies of the power stage module are attached to a side of the circuit board to which the TLVR inductor module is directly mounted, and wherein the power semiconductor dies are interposed between the TLVR inductor module and the circuit board.

Terms such as "first", "second", and the like, are used to describe various elements, regions, sections, etc. and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

The expression "and/or" should be interpreted to include all possible conjunctive and disjunctive combinations, unless expressly noted otherwise. For example, the expression "A and/or B" should be interpreted to mean only A, only B, or both A and B. The expression "at least one of" should be interpreted in the same manner as "and/or", unless expressly noted otherwise. For example, the expression "at least one of A and B" should be interpreted to mean only A, only B, or both A and B.

It is to be understood that the features of the various embodiments described herein may be combined with each other, unless specifically noted otherwise.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A trans-inductor voltage regulator (TLVR) inductor module, comprising:
- a magnetic core;
- a first winding embedded in the magnetic core;
- a second winding embedded in the magnetic core and inductively coupled to the first winding;
- a third winding embedded in the magnetic core;
- a fourth winding embedded in the magnetic core and inductively coupled to the third winding; and
- a first integrated metallic connector that connects the second winding and the fourth winding in a series loop,
- wherein a first end and a second end of the first winding and a first end and a second end of the third winding are exposed at a first side of the TLVR inductor module,
- wherein the first integrated metallic connector interconnects a first end of the second winding and a first end of the fourth winding at the first side of the TLVR inductor module,
- wherein the first winding covers the second winding,
- wherein the third winding covers the fourth winding, and
- wherein the first winding and the third winding are exposed at a second side of the TLVR inductor module opposite the first side.

2. The TLVR inductor module of claim 1,
wherein a second end of the second winding and a second end of the fourth winding are exposed at the first side of the TLVR inductor module.

3. The TLVR inductor module of claim 1,
wherein a single continuous metallic body forms the second winding, the fourth winding, and the first integrated metallic connector.

4. The TLVR inductor module of claim 1,
wherein the first integrated metallic connector is separate from the second winding and the fourth winding, and
wherein the first integrated metallic connector is attached to the first end of the second winding and the first end of the fourth winding.

5. The TLVR inductor module of claim 1, further comprising:
- a fifth winding embedded in the magnetic core;
- a sixth winding embedded in the magnetic core and inductively coupled to the fifth winding; and
- a second integrated metallic connector that connects the sixth winding in the series loop.

6. The TLVR inductor module of claim 5,
wherein a first end and a second end of the fifth winding are exposed at the first side of the TLVR inductor module,
wherein the second integrated metallic connector interconnects a second end of the fourth winding and a first end of the sixth winding at the first side of the TLVR inductor module.

7. The TLVR inductor module of claim 6,
wherein a second end of the second winding and a second end of the sixth winding are exposed at the first side of the TLVR inductor module.

8. A power electronics assembly, comprising:
- a power stage module comprising a circuit board and a plurality of power semiconductor dies attached to or embedded in the circuit board and electrically interconnected to form part of a power converter circuit; and
- a trans-inductor voltage regulator (TLVR) inductor module directly mounted to the circuit board of the power stage module without any intervening circuit board,
- wherein the TLVR inductor module comprises:
  - a magnetic core;
  - a first winding embedded in the magnetic core;
  - a second winding embedded in the magnetic core and inductively coupled to the first winding;
  - a third winding embedded in the magnetic core;
  - a fourth winding embedded in the magnetic core and inductively coupled to the third winding; and
  - a first integrated metallic connector that connects the second winding and the fourth winding in a series loop,
- wherein the first winding and the third winding form part of the power converter circuit,
- wherein a first end and a second end of the first winding and a first end and a second end of the third winding are exposed at a first side of the TLVR inductor module and attached to the circuit board of the power stage module, and
- wherein the first integrated metallic connector interconnects a first end of the second winding and a first end of the fourth winding at the first side of the TLVR inductor module.

9. The power electronics assembly of claim 8, further comprising:

an inductor outside the TLVR inductor module and part of the series loop that includes the second winding and the fourth winding of the TLVR inductor module.

10. The power electronics assembly of claim 8, wherein a second end of the second winding and a second end of the fourth winding are exposed at the first side of the TLVR inductor module and attached to the circuit board of the power stage module.

11. The power electronics assembly of claim 10, further comprising:

an inductor attached to the circuit board of the power stage module and included in the series loop between the second end of the second winding and the second end of the fourth winding.

12. The power electronics assembly of claim 10, wherein the second end of the second winding and the second end of the fourth winding are grounded.

13. The power electronics assembly of claim 8, wherein the first winding and the third winding are exposed at a side of the TLVR inductor module that faces away from the power stage module.

14. The power electronics assembly of claim 13, further comprising:

a heat exchanger mounted to the side of the TLVR inductor module that faces away from the power stage module, wherein the heat exchanger is thermally coupled to the exposed part of the first winding and the third winding at the side of the TLVR inductor module that faces away from the power stage module.

15. The power electronics assembly of claim 8, wherein the power semiconductor dies of the power stage module are attached to a side of the circuit board to which the TLVR inductor module is directly mounted, and wherein the power semiconductor dies are interposed between the TLVR inductor module and the circuit board.

16. A trans-inductor voltage regulator (TLVR) inductor module, comprising:

a magnetic core;

a first winding embedded in the magnetic core;

a second winding embedded in the magnetic core and inductively coupled to the first winding;

a third winding embedded in the magnetic core;

a fourth winding embedded in the magnetic core and inductively coupled to the third winding; and a first integrated metallic connector that connects the second winding and the fourth winding in a series loop, wherein a first end and a second end of the first winding and a first end and a second end of the third winding are exposed at a first side of the TLVR inductor module, wherein the first integrated metallic connector interconnects a first end of the second winding and a first end of the fourth winding at the first side of the TLVR inductor module, wherein the second winding is arranged side-by-side the first winding, wherein the fourth winding is arranged side-by-side the third winding, and wherein the first winding and the third winding are exposed at a second side of the TLVR inductor module opposite the first side.

17. The TLVR inductor module of claim 16, wherein the second winding and the fourth winding are exposed at the second side of the TLVR inductor module.

18. A trans-inductor voltage regulator (TLVR) inductor module, comprising:

a magnetic core;

a first winding embedded in the magnetic core;

a second winding embedded in the magnetic core and inductively coupled to the first winding;

a third winding embedded in the magnetic core;

a fourth winding embedded in the magnetic core and inductively coupled to the third winding;

a first integrated metallic connector that connects the second winding and the fourth winding in a series loop;

a fifth winding embedded in the magnetic core;

a sixth winding embedded in the magnetic core and inductively coupled to the fifth winding; and a second integrated metallic connector that connects the sixth winding in the series loop, wherein a first end and a second end of the first winding, a first end and a second end of the third winding, and a first end and a second end of the fifth winding are exposed at a first side of the TLVR inductor module, wherein the first integrated metallic connector interconnects a first end of the second winding and a first end of the fourth winding at the first side of the TLVR inductor module, and wherein the second integrated metallic connector interconnects a second end of the fourth winding and a first end of the sixth winding at the first side of the TLVR inductor module.

19. The TLVR inductor module of claim 18, wherein a second end of the second winding and a second end of the sixth winding are exposed at the first side of the TLVR inductor module.

20. A power electronics assembly, comprising:

a power stage module comprising a circuit board and a plurality of power semiconductor dies attached to or embedded in the circuit board and electrically interconnected to form part of a power converter circuit; and a trans-inductor voltage regulator (TLVR) inductor module directly mounted to the circuit board of the power stage module without any intervening circuit board, wherein the TLVR inductor module comprises:

a magnetic core;

a first winding embedded in the magnetic core;

a second winding embedded in the magnetic core and inductively coupled to the first winding;

a third winding embedded in the magnetic core;

a fourth winding embedded in the magnetic core and inductively coupled to the third winding;

a first integrated metallic connector that connects the second winding and the fourth winding in a series loop; and a heat exchanger mounted to a side of the TLVR inductor module that faces away from the power stage module, wherein the first winding and the third winding form part of the power converter circuit, wherein the first winding and the third winding are exposed at the side of the TLVR inductor module that faces away from the power stage module, wherein the heat exchanger is thermally coupled to the exposed part of the first winding and the third winding at the side of the TLVR inductor module that faces away from the power stage module.

21. A power electronics assembly, comprising:

a power stage module comprising a circuit board and a plurality of power semiconductor dies attached to or embedded in the circuit board and electrically interconnected to form part of a power converter circuit; and a trans-inductor voltage regulator (TLVR) inductor module directly mounted to the circuit board of the power stage module without any intervening circuit board, wherein the TLVR inductor module comprises:

a magnetic core;

a first winding embedded in the magnetic core;

a second winding embedded in the magnetic core and inductively coupled to the first winding;

a third winding embedded in the magnetic core;

a fourth winding embedded in the magnetic core and inductively coupled to the third winding; and a first integrated metallic connector that connects the second winding and the fourth winding in a series loop, wherein the first winding and the third winding form part of the power converter circuit, wherein the power semiconductor dies of the power stage module are attached to a side of the circuit board to which the TLVR inductor module is directly mounted, and wherein the power semiconductor dies are interposed between the TLVR inductor module and the circuit board.

* * * * *